United States Patent [19]

Arnold et al.

[11] Patent Number: 4,637,712

[45] Date of Patent: Jan. 20, 1987

[54] SYSTEM FOR PACKAGE PHOTOPRINTING

[75] Inventors: Marc E. Arnold, St. Louis, Mo.; Mitchell S. Marcus, Winnetka, Calif.

[73] Assignee: Hasco International, Inc., St. Charles, Mo.

[21] Appl. No.: 673,599

[22] Filed: Nov. 21, 1984

[51] Int. Cl.⁴ .......................... G03B 27/62; G03B 27/32

[52] U.S. Cl. .......................................... 355/75; 355/39; 355/50; 355/64; 355/77

[58] Field of Search ..................... 281/5, 8; 355/39–43, 355/50, 64, 75, 77, 133; 354/105; 40/158 B

[56] References Cited

U.S. PATENT DOCUMENTS

| | | | |
|---|---|---|---|
| 4,291,972 | 9/1981 | Laska et al. | 355/40 |
| 4,405,228 | 9/1983 | Muscoplat | 355/75 |
| 4,432,637 | 2/1984 | Baschung | 355/50 X |
| 4,574,692 | 3/1986 | Wahli | 355/40 X |

OTHER PUBLICATIONS

"Preventing Copying of Classified Information", IBM *Tech. Disclosure Bulletin,* vol. 19, No. 4, Sep. 1976, pp. 1469–1470.

*Primary Examiner*—Richard A. Wintercorn
*Attorney, Agent, or Firm*—Jerome A. Gross

[57] ABSTRACT

For use in photographic package printing, selected negatives are cut from the film rolls and mounted in individual paper negative carriers, imprinted with bar-coded order details. A novel reader-feeder reads the bar-coded order on each of the carrier and stores the order in the memory of its microprocessor. When photoprinting of a prior order has been completed, the reader-feeder withdraws the prior negative carrier, feeds the newly-read negative carrier to the package printer, and inputs its stored order to a conventional printer-controller, which directs the photoprinter in the same manner as if an operator was key-inputting the order into the printer-controller.

The paper negative carriers are supplied in manifold form, for computerized imprinting. These consist of die-cut front sheets having an adhesive backing on a waxed manifold web. Aligned rectangular cut-outs, the larger of which is in the web, provide an adherent mounting frame when the cut-out portions are removed.

11 Claims, 4 Drawing Figures

SYSTEM FOR PACKAGE PHOTOPRINTING

FIELD OF THE INVENTION

This invention relates to a system of photographic package printing, employing paper individual negative carriers created from a manifold form, each computer-printed with a bar-coded order. A new automated reader-feeder both issues the print orders to a conventional printer-controller and feeds the negative carriers to a conventional package printer.

BACKGROUND OF THE INVENTION

Photographic package printing requires the production of a number of sets of photoprints, each set in a variety of sizes, from selected film exposures, herein referred to as negatives, on film rolls which include the several exposures taken of a number of persons. The conventional way of making up package photoprint orders requires the essentially manual operation of selecting the negatives to be photoprinted and positioning them in the photo-printer. In contrast, the photoprinting itself is a sophisticated operation, the print assortments being made by a package photoprinter, such as made by Nord Photo Engineering Co., directed and controlled by a computerized printer-controller, preferably of the type made by Bremson Data Systems, Inc. The operator key-inputs the order into the computerized printer-controller; this then directs the photoprinter in making the number of photoprints of each size called for by the order.

Systems have been proposed, and to some extent used, to automate the order-inputting operation, leaving the film in roll form. In one such system, a digital cassette tape is made up, whose flow is to be synchronized with the transport of the roll film through the photoprinter; when a selected negative is reached, the cassette tape inputs to the printer-controller the number and size of prints to be made. In another proposed system, magnetic strips, encoded with the information of orders for printing, are made up for adherence along the edge of the roll film, to be read by a magnetic reader as the film is unrolled in the photoprinter, the reading being similarly inputted to such printer-controller. To feed automated inputs to a printer-controller, instead of having an operator key-input the order information, is therefore known prior art. However, both of these systems, for automated input of order information from roll film, are believed to be fraught with many difficulties. Applicants know of no prior automated system using carriers for individual negatives.

SUMMARY OF THE INVENTION

The purposes of the present invention include automating the operation of such a printer-controller and package printer to process a succession of orders for package photoprinting. An additional purpose is to provide new disposable computer-printed, machine-readable carriers for individual negatives, which carriers direct a printer-controller. A further purpose is to provide apparatus for reading such carriers and inputting their order information to a printer-controller, as well as feeding the carriers themselves to a package photoprinter. A still further purpose is to provide visual identification of each photoprinted order with the order itself, so that a succession of orders, computer-printed on negative carriers, may be correlated with computer-printed transmission documents.

These and other purposes of the foregoing invention are achieved in a manner briefly described as follows:

A manifold form is provided for computer-printing of orders in both visually-readable and machine-readable (preferably bar-coded) form on rectangular front sheets carried by a waxed web which, when torn apart, provides individual negative carriers having adhesive frames. After a selected negative is mounted in each carrier, the carriers are arranged in a succession, and transmission documents corresponding to their orders are printed and arranged in the same succession.

The succession of mounted negative carriers is then loaded in the present automated reader-feeder (sometimes referred to herein as an "automator"), which serves these functions: it feeds the carriers into, and withdraws them from, a conventional package photoprinter; and it reads their bar-coded print orders and inputs these orders into a conventional printer-controller. As to negative carriers whose bar coding is not successfully read, the present automator separates these into a "reject" bin, for individual reading and handling by the operator.

As a new step in photoprinting, the automated feeder-reader partially withdraws each negative carrier, to the point of bringing into registration for photoprinting, visually-readable identifying information imprinted on the carrier outward of the framed negative. Photoprinting of such identifying information along with the print order provides for sure and easy matching of each photoprinted order with its transmission documents, such as mailing envelope and form for billing the order.

These and other aspects of the present invention will be explained in the description which follows.

DESCRIPTION OF THE PREFERRED EMBODIMENT

Figures 1, 2, 3:
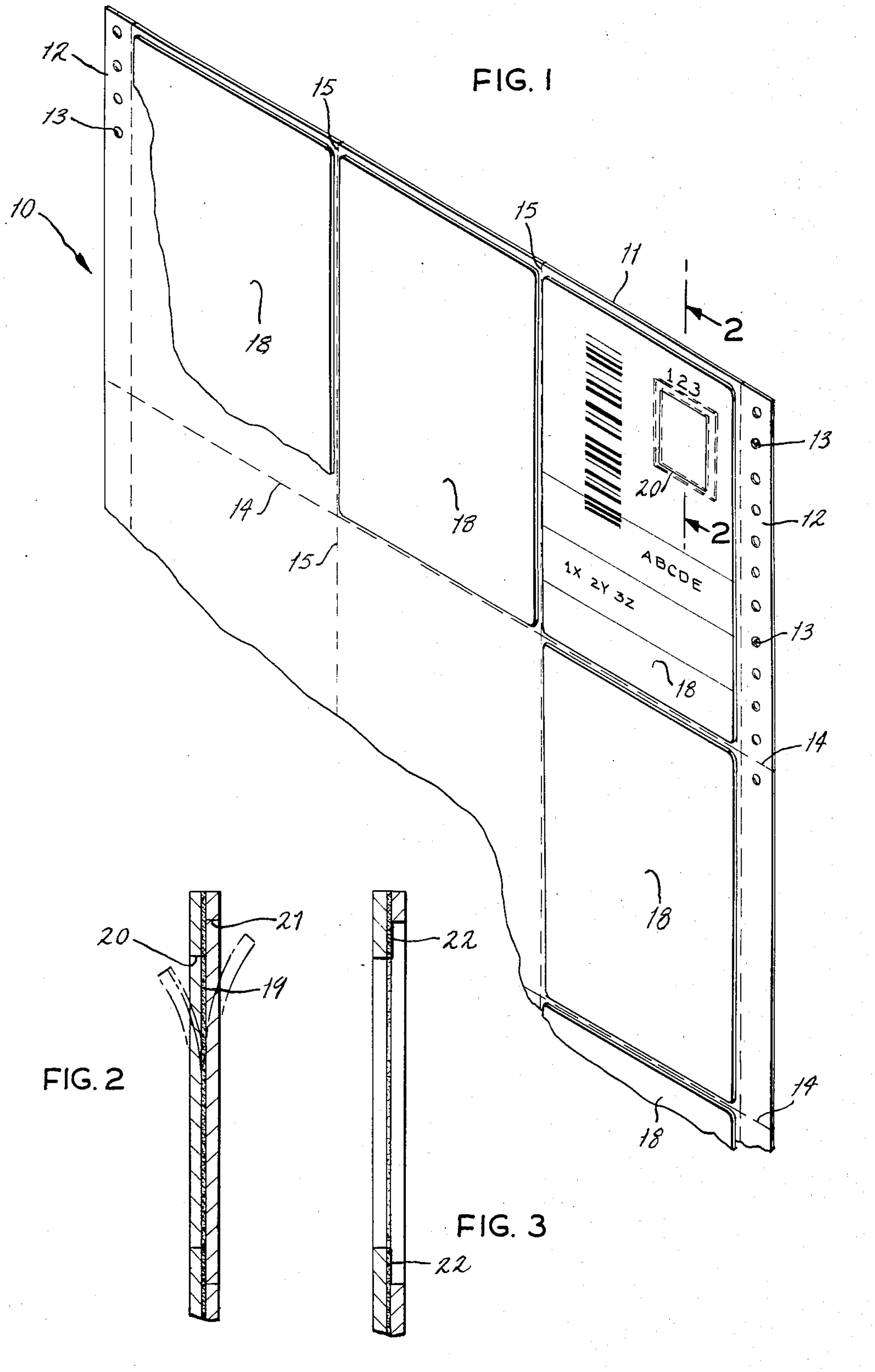
FIG. 1 is a view of a manifold form for negative carriers embodying the present invention. The portion at the upper right shows one of said negative carriers after imprinting by a computer.
FIG. 2 is an enlarged fragmentary view taken along line 2—2 of FIG. 3 showing die-cut portions being peeled away to provide a frame for a film negative.
FIG. 3 is a view corresponding to FIG. 2 showing the die-cut portions thereof fully peeled away.

A manifold form for negative carriers, which form and the carriers thereof embody the present invention, is generally designated 10 in FIG. 1. It is comprised of a translucent, substantially continuous web 11 of waxed paper, whose side margins 12 incorporate aligned holes 13 which serve as drivable means for facilitating the imprinting of a succession of orders by a computer-printer, not shown. The web 11 is divided by horizontal score lines 14 and vertical score lines 15 into a plurality of equal-sized rectangular portions, excluding the margins 12.

Adhered to the web 11 are a plurality of translucent die-cut front sheets 18 of paper, which, in contrast to the paper of the web 11, is characterized by capability of being imprinted, as by a computer-printer. The front sheets 18 are of round-cornered rectangular shape slightly smaller than the rectangular portions divided by the web score lines 14, 15. On the back side of each sheet 18, that is, the surface presented toward the waxed paper web, is a translucent adhesive coating 19, best seen in FIG. 2, the adhesive being of a commercially available type capable of retaining photographic film, as for example, the "high-tac" pressure-sensitive adhesive #1304 obtainable from the Fasson Industrial Division of Avery International, Painesville, Ohio. As a matter of manufacturing practice, the die-cut front sheets 18 may be manufactured as a continuous web divided by die-cuts or substantially cut score lines; the narrow portions, between the front sheets 18 which they demark, being readily removed from the waxed web 11. In this respect, the manner of manufacture may be similar to that of self-adhesive labels. Conveniently a portion of each front sheet 18, for example its lower portion, may also be die-cut to serve as a mailing label.

Each of the front sheets 18 is provided with a rectangular front frame opening score line 20, of the size desired to permit projection of the negative film therethrough. The front frame opening score line 20 is aligned in centered position relative to a larger rectangular frame score line 21 in the waxed web 11. After imprinting as hereinafter described, and separation into individual negative carriers, the portions within their score lines are readily pressed out or peeled away as shown in the phantom lines of FIG. 2, to provide each individual negative carrier with a frame portion, as shown in FIG. 3, having a rearwardly-presented adhesive frame margin 22 in which a film negative may be mounted.

While still in manifold form, a computer, into which individual orders for photo-package printing have been inputted, prints each order on one of the front sheets 18, using both machine-readable and visually-readable imprinting. The preferred form of machine-readable imprinting is by bar-coding, with the bars arranged in the same order as the direction in which the negative carriers will be fed to the feeder-reader to be described, that is, vertically from top to bottom as shown in FIG. 1. Such bar-coding indicates at least the number and size of photoprints called for by the order, in sufficient detail for interpretation by a conventional computerized printer-controller. Similar information is also imprinted in visually-readable letters and numbers, shown in FIG. 1 in abbreviated form as merely "1x 2y 3z." Other order information, such as the name and address of the person ordering, is also imprinted in visually-readable form, as indicated in FIG. 1 by the letters "A, B, C, D, E". Also imprinted, preferably above the frame to be formed, is some brief visually-readable identification, shown as "1, 2, 3"; this is to be used for correlating the order when photoprinted with the billing data and other transmission documents, including a mailing envelope, which will accompany the order.

As used herein, the term "visually-readable" means the imprinting, as in letters and numbers, for easy reading by eye, in contrast to the bar-coding or other type of machine-readable marking readily read by scanning devices.

Having been so computer printed, the manifold form 10 is separated into individual negative carriers by tearing off the margins 12 and along the score lines 14, 15. Since the web 11 is waxed, the tearing-apart operation is substantially lint-free; likewise, the pressing out or peeling away of the portions within the frame score lines 20, 21.

From the visually-readable matter so imprinted on each individual negative carrier, the roll of film containing the exposures which are to be photoprinted is identified and retrieved from storage; an operator selects the film negative to be printed and cuts it from the roll of film, to a size which will fit within the larger opening provided by the rectangular frame score line 21 in the negative carrier. Mounting is accomplished by pressing the film against the adhesive margin 22, for secure retention. Then, as the operator puts the mounted negative carrier in a succession with the others, similarly mounted, he transmits to the computer an identification of the order whose negative has been so mounted. The computer imprints the transmission documents, including a billing document, in the same succession as the mounted negative carriers.

Figure 4:
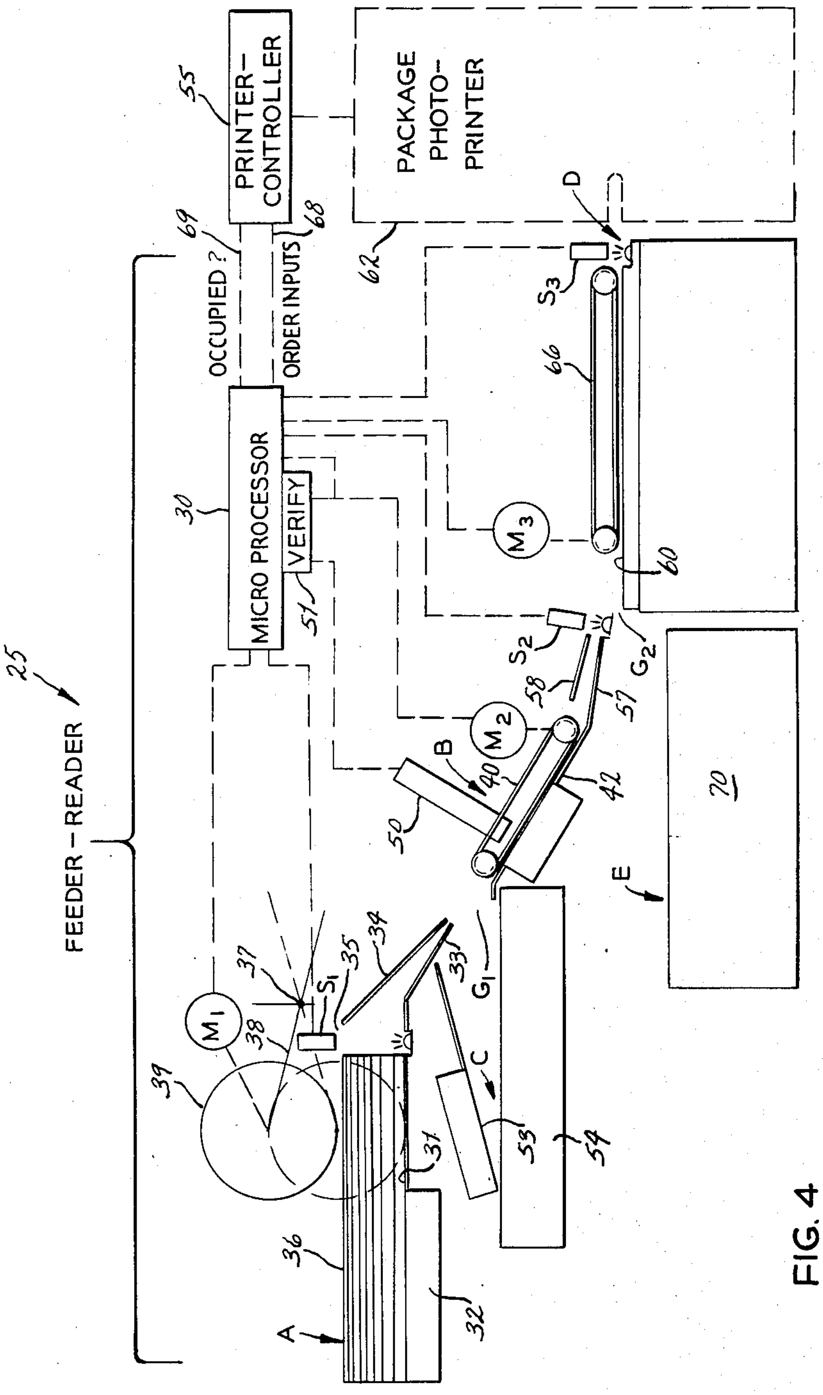
FIG. 4 is a schematic view of an automated feeder-reader for negative carriers of the type shown in the upper right portion of FIG. 1.

The negative carriers, in their succession, are then delivered to the loading station of an automated feeder-reader, generally designated 25, controlled by a microprocessor 30, the apparatus being shown schematically in FIG. 4.

The feeder-reader 25 is a substitute for a human operator who would otherwise operate the same printer-controller 55 and package photoprinter 62, hereafter described. Except as to those few negative carriers whose bar-coded orders it may be unable to read and verify, it reads the print order on each negative carrier, for the quantity of each size of photoprint to be made; and it inputs this data into the input section of a printer-controller 55, just as if the same data were being key-inputted by a human operator or by the prior art automated input systems described. Further, it inserts the individual negative carriers, so read, into the package photoprinter 62 for printing under the control of the printer-controller 55, and when the printing is concluded, it withdraws the negative carrier and places it in a "completed" bin. As to those negative carriers whose orders it cannot read and verify, it places these in a "reject" bin, for consideration by the person supervising its operations.

Considered as apparatus, the feeder-reader or "automator" 25 includes the following generally designated stations: a loading station A, a reading station B, a rejected station C, an insertion-withdrawal or feed station D and a completed station E. Transfer of the negative carriers from one station to another is directed by a microprocessor 30 in the manner now described.

The loading station A is essentially a horizontal platform 31 mounted by a flange 32 to the sides of a cabinet, not shown. The platform 31 terminates at its forward edge in a downwardly-inclined lip 33. Spacedly above the lip 33 is a guide plate 34 similarly flange-mounted to the machine cabinet, with its rearward edge 35 located at a spacing above the horizontal platform 31 an amount at least slightly greater than the height of the stack 36 of negative carriers to be fed, thus deflecting them downward when fed forwardly. The guide plate 34 extends downward at an angle to the lip 33, as shown. Since the manner of mounting by flanges is obvious, no part number is here or hereafter given to mounting flanges.

The following elements are all shown schematically. Mounted on a pivot 37, an arm 38 carries a feed wheel 39, its position for feeding from a full feed stack 36 being shown in solid lines and its position for feeding when the bottom of the stack is reached being shown in broken lines, the feed wheel 39 lowering by its own weight. The feed wheel 39 is driven by a first stepping motor M1, so controlled by the microprocessor 30 as, when the apparatus is started, to feed a single negative carrier on command of the printer-controller 55 and then stop. After feeding a negative carrier from the top of the stack 36, an infra-red sensor S1, offset from the stack forward end, checks to determine whether the next carrier has been inadvertently drawn forward, and if so, furnishes a signal to the microprocessor 30, which then directs the stepping motor M1 to drive in reverse, sufficiently to straighten the stack 36.

The negative carrier which has been so fed from the top of the stack 36, and so deflected downward, descends between the lip 33 and the guide plate 34, which guides it downward across a first gap G1, to engage the spaced-apart driving belts of a reader conveyor drive 40. Driven by a second motor M2, the conveyor drive 40 propels the negative carrier along an inclined plate 42 beneath a bar-code reader 50, positioned between the belts, until stopped when the carrier interrupts a second sensor S2; this is located at the outlet end of a delivery plate 57 mounted to extend from the lower end of the inclined plate 42, at a lesser inclination. Spaced over the delivery plate is a second guide plate 58.

The bar code reader 50 is preferably of the conventional reflective type; it is connected to verifying circuitry 51 of the microprocessor 30; this circuitry 51 determines whether there has been an intelligible verified reading of the bar-coded order on the negative carrier. For example, a reading which purports to be for an incredibly large quantity of prints could not pass the verifying circuitry 51. If the reading is not first verified, the microprocessor 30 directs the motor M2 to reverse and then feed again past the bar-code reader 50, for design number of attempts, for example, six. If there has then been no verified reading, the motor M2 is actuated in reverse, driving the negative carrier slopingly upward under the lip 33, against a downward-sloping deflector plate 53 and into a bin 54 at the reject station C.

If the order information so read is duly verified, it is stored in the microprocessor 30 while the negative carrier remains at the read station B, held until the microprocessor 30 receives status information from the printer-controller, generally designated 55, as to whether the package photoprinter 62 is occupied, as hereafter described.

Below the lower end of the delivery plate 57 is a second gap G2, beneath which is a preferably horizontal feed table surface 60. Overlaying the surface 60 is a feed conveyor 61, preferably of similar construction to the read conveyor 40, being made up of spaced-apart belts and drive wheels driven by a motor M3. The feed conveyor 61 is of sufficient length to feed a negative carrier along the feed table surface 60 into, and out of, a conventional package photoprinter generally designated 62, its presence in feed position being sensed by the infra-red sensor S3, positioned just beyond the forward end of the feed conveyor 61. The package photoprinter 62 may be of the type manufactured by Nord Photo Engineering Co., with those obvious minor modifications required to utilize the present individual negative carriers rather than roll film. When the negative carrier is inserted in it for photoprinting the order so read, its operation is controlled by the printer-controller 55 in the conventional manner, that is, as if no automator 25 was utilized.

The microprocessor 30 inputs the print order, so read from the negative carrier, over an order input line 68, to the same inputs of the printer-controller 55 as would be utilized if each order was manually inputted. A photoprinter status line 69, from the printer-controller 55 to the microprocessor 30, keeps it advised of the status of the photo-package printer 62, that is, whether occupied or available.

When photoprinting of the bar-coded order is complete, on command of the printer-controller 55 to the motor M3, the feed conveyor 61 withdraws the negative carrier a fraction of an inch along the feed table surface 60, enough to bring the order identifying information "1, 2, 3" into photoprinting position within the package photoprinter 62. When this has been photoprinted through the translucent negative carrier, the motor M3 then drives the negative carrier backward beneath the delivery plate 57 through the second gap G2 and into a bin 70 at the completed station E. Both the status line 69 and the sensor S3 then signal that the feed station D is unoccupied.

On receipt of such signals the microprocessor 30 directs the read station motor M2 to propel the next negative carrier, then held at the reading station B, forward and downward across the gap G2 onto the feed table 60 beneath the feed conveyor 61. This latter conveyor delivers the negative carrier into the photoprinter 62, intercepting the sensor S3. The microprocessor 30 then directs the feed motor M1 to feed another negative carrier from the stack 36 to the reading station B after which the previously described operations are repeated.

From the foregoing description of its operations, the microprocessor 30 may readily be conventionally constructed of state-of-the-art components, as each designer may select to serve these functions described.

Continuing with the description of the present process: the package photoprinter 62 makes the ordered assortments of prints on a continuous web of photoprint paper, to be cut into identifiable orders for cut-apart prints. Since the identifying information for each order (such as the "1, 2, 3" for the order of the foregoing illustration) has been photoprinted on the web as the order is completed, each order may be readily identified and correlated with its computer-printed transmission document or documents. Further, since the transmission documents have been computer-imprinted in the same succession as the carriers have been mounted with their negatives, the photoprint assortments will (except for rejected negative carriers) leave the photoprinter 62 in the same succession as their transmission documents. This eliminates the mistakes and disorder which otherwise would be likely to occur in making such correlation. Without these steps, taken to assure accurate correlation, serious errors in matching the completed photoprints with transmission documents might frequently occur. Such likelihood of error is particularly great when the persons photographed resemble each other, for example, new-born infants.

It will be understood that the present invention is applicable to exposures made on positive film as well as those made on negative film. The terms "film negative," "negative carrier" and other references to "negatives," used herein for convenience, are to be taken both in the specification and the claims as including positive films. Likewise, "score lines" or "scored" is to be taken to include "die cut."

From the foregoing description, choices of conventional circuitry, and of mechanical and electrical elements, may readily be made, the elements being selected by designers from those known elements which he considers best adapted to his use of the invention. Accordingly, variations in both the paper negative carrier, the apparatus and the process herein described will from this specification be apparent to those skilled in the art.

We claim:

1. For producing an order for package photoprints in a photographic package printer subject to the control of a printer controller, the combination of an order form and negative carrier having a rectangular backing of waxed paper, a die-cut front sheet of paper characterized by capability to absorb printing ink and having, in contact with the waxed paper backing, a coating of an adhesive capable of retaining photographic film, the waxed backing and front sheet being scored with a larger frame opening in the backing and a smaller frame opening in the front sheet aligned in centered position relative to said larger frame opening, the portions of said backing and front sheet within such frame opening scores being removed, whereby to provide a frame portion with a rearwardly presented adhesive frame margin, a film negative mounted therein by said adhesive, and an order ink-imprinted on said front sheet, outward of such frame portion, in both visually readable and bar-coded form, in combination with feeder-reader apparatus for said negative carrier comprising a loading station at a loading level and means to feed said negative carrier forwardly therefrom, means to provide a negative carrier path including a downward-sloping path portion extending from said loading station to such package printer and having a first path gap at a level below such loading level, a bar-code reader positioned along said downward sloping path at a level below that of said first path gap, for reading said negative carrier as it moves along such path, a rejected station at a level below said loading station and adjacent to and aft of said first path gap, means along such path to retain said negative carrier in position, to advance it along such path, and to reverse its movement therealong, whereby should a reading by said bar-code reader be unacceptable, said negative carrier may be reversed for re-reading or for driving slopingly upward along such path and aft through said first gap to said rejected station, and whereby if such reading is acceptable the negative carrier may be retained until such photographic package printer is unoccupied by any prior negative carrier, said means to provide a path including a further path portion for feeding said negative carrier forward, at a lesser slope, into such photographic package printer, such further path portion being at a level spacedly below said downward-sloping path, whereby to establish a second gap therebetween, a completed station adjacent to and aft of said second gap, and means to advance such negative carrier along such further path portion and to withdraw it therealong, whereby on advancing to insert it into such photographic package printer, and on withdrawing to deliver such negative carrier through said second gap and to such completed station, said feeder-reader apparatus further having microprocessor means to store such readings and to transmit them to such a printer-controller for controlling the operation of such a photographic package printer when such negative carrier has been so inserted therein.

2. For use with a reader-equipped photographic package printer, a manifold form for carriers to mount a film negative and be ink-imprinted with identifying data and a machine-readable order for photoprinting, comprising a translucent web of waxed paper having margins including drivable means, and being divided by score lines into a plurality of equal-sized rectangular portions, said waxed paper web having adhered thereto a plurality of translucent die-cut front sheets of paper characterized by capability of being imprinted, said sheets of paper being of generally rectangular shape slightly smaller than the rectangular portions defined by said web score lines, each sheet having, in contact with the waxed paper web, a translucent coating of an adhesive capable of retaining photographic film, the waxed web and front sheets of the manifold form being scored with a larger frame opening in each such rectangular portion of the web, and a smaller frame opening in each said die-cut front sheet aligned in centered position relative to said larger frame opening, whereby tearing the web along said score lines and removing the portions of both the web and the front sheets within their scored frame openings, separates the manifold form into individual order-negative carriers each including a frame portion with a rearwardly-presented adhesive frame margin, in which a film negative may be mounted for automated package photoprinting.

3. A negative carrier comprising a backing sheet of waxed paper, and a die-cut front sheet of paper of substantially the same size as said backing sheet and having a coating of pressure-sensitive adhesive capable of retaining photographic film which coating is in continuous contact with said waxed paper backing, the backing and front sheets being so scored as to provide a larger frame opening in the waxed backing sheet and a smaller frame opening in the front sheet aligned in centered position relative to said larger frame opening, both of said sheets being undivided in their areas surrounding their said frame openings, whereby on removing those portions of said backing and front sheets within their said frame opening scores, the smaller frame opening of the front sheet provides a rearwardly-presented adhesive frame margin, and the larger opening in the waxed paper sheet provides a frame space in which a photographic film may be mounted by positioning the film therein and pressing the film edge against the said adhesive frame margin.

4. A combination order form and negative carrier as defined in claim 3, wherein the machine-readable form in which said order is imprinted is bar-coding.

5. A combination order form and negative carrier as defined in claim 3, wherein the wax paper backing, the front sheet and the coating of adhesive are translucent, and wherein a visually readable identifying portion of said order is imprinted on said front sheet in advance of the frame opening, taken as in position for inserting into a photographic printer.

6. Feeder-reader apparatus for feeding to a photographic package printer a plurality of substantially flat planar bar-coded negative carriers subject to the command of a printer controller, comprising a loading station at a loading level and means to feed one of said negative carriers forwardly therefrom, means to provide a negative carrier path including a downward-sloping path portion extending from said loading station and having a first path gap at a level below such loading level, a bar-code reader positioned along said downward-sloping path at a level below that of said first path gap, for reading such negative carrier as it moves along such path, a rejected station at a level below said loading station and adjacent to and aft of said first path gap, means along such path portion to retain such negative carrier in position, to advance it along such path, and to reverse its movement therealong, whereby should a reading by said bar-code reader be unacceptable, such negative carrier may be reversed for rereading or for driving slopingly upward along such path and aft through said first gap to said rejected station, and whereby if such reading is acceptable, the negative carrier may be retained until such photographic package printer is unoccupied by any prior negative carrier, said means to provide a path including a further path portion for feeding such negative carriers forward, at a lesser slope, into such photographic package printer, such further path portion being at a level spacedly below said downward-sloping path, whereby to establish a second gap therebetween, a completed station adjacent to and aft of said second gap, and means to advance such negative carrier along such further path portion and to withdraw it therealong, whereby on advancing, to insert it into such photographic package printer, and on withdrawing to deliver such negative carrier through said second gap and to such completed station, said feeder-reader apparatus further having microprocessor means to store such readings and to transmit them to such a printer-controller for controlling the operation of such a photographic package printer when such negative carrier has been so inserted therein.

7. For use with a photographic package printer and separate negative carriers each coded with its own order information, printer-directing apparatus which preliminarily separates out those coded negative carriers whose order information cannot be successfully read, comprising A. a station for loading a plurality of such individual negative carriers, a station for reading such carriers including a code reader thereadjacent, a reject station for carriers not successfully read, and a completed station, B. a first feed path portion having means for delivering such order-coded negative carriers separately from said loading station to said reading station, a reject path portion having means for conveying a negative carrier from said reading station to said reject station, a further feed path portion from said reading station to said printer having means to convey a negative carrier thereto, and a completed path portion having means to convey a negative carrier from said printer to said completed station, and C. electronic means to actuate said means for delivery along said first feed path portion from said loading station to said reading station when said reading station is unoccupied, and to determine whether the reading of each such negative carrier is successful, and if not successful to actuate said means for conveying along said rejected path portion from said reading station to said reject station, and if successful to store such reading for utilization by such photographic printer, and when such printer is unoccupied to actuate such means to convey from said reducing station along said further feed path portion to such printer, and to direct it to print according to such stored reading, and on completion of printing to actuate the said means to convey from such printer along said completed path portion to said completed station.

8. The automated method of following out and filling a plurality of orders for photographic package printing, comprising the steps of entering such plurality of orders into a computer, utilizing such computer for transcribing and ink-imprinting each such order, in both visually-readable and machine-readable form, on one of the cut front sheets of a manifold form for film negative carriers, such manifold form including a web of waxed paper having margins including drivable means, and being divided by score lines into a plurality of equal-sized rectangular portions, said waxed paper web having adhered thereto a plurality of die-cut front sheets of paper characterized by capability to absorb ink, said sheets of paper being of generally rectangular shape slightly smaller than the rectangular portions defined by said web score lines, each sheet having, in contact with the waxed paper web, a coating of an adhesive capable of retaining photographic film, the waxed web and front sheets of the manifold form being scored with a larger frame opening in each such rectangular portion of the web, and with a smaller frame opening in each said die-cut front sheet aligned in centered position relative to said larger frame opening, then tearing the waxed web along said score lines and removing the portions of both the web and the front sheets within their scored frame openings, whereby to separate the manifold form into individual order-negative carriers each including a frame with a rearwardly-presented adhesive frame margin, in which a film negative may be mounted, then identifying, from such ink imprinting on each negative carrier, a film negative to which the order imprinted thereon relates, and mounting it against the adhesive frame margin of such order-negative carrier, arranging such mounted order-negative carriers in a succession, causing such computer to print a transmission document for each order in the same succession as such order-negative carrier, and then transmitting each such photoprint order individually to a printer-controller and of feeding their negatives to a photographic package printer, of the type which makes a plurality of print sizes on a continuous web of photosensitive paper, by the steps including loading a plurality of such individual machine-readable order-negative carriers in such succession at a loading station, feeding to a machine-reader, at a reading station, one of such carriers, machine-reading, from its order, the number of prints of each size to be made, storing such order information until the photographic package printer is not occupied by any prior carrier, and when the printing of any such prior carrier is completed, then withdrawing such prior carrier from the package printer, inserting, into such package printer, the carrier whose order information has been so machine-read and stored, in position for photoprinting, transmitting said stored order information to such printer-controller, whereby it may direct said package printer to photoprint such plurality of print sizes according to such recalled order, and while the package printer is so occupied by the inserted carrier, as to each succeeding carrier, repeating the aforesaid steps of feeding, machine-reading, storing, withdrawing, inserting and transmitting, and continuing until the last negative carrier has been withdrawn, then cutting apart the photoprinted web to yield a succession of photoprinted orders, and correlating each such photoprinted order with a transmission document applicable thereto.

9. The automated method of transmitting individual photoprint orders encoded for machine reading on negative carriers, to a printer-controller and of feeding their negatives to a photographic package printer, of the type which makes a plurality of print sizes on a continuous web of photosensitive paper, comprising the steps of loading a plurality of such order-negative carriers at a loading station, feeding to a machine-reader, at a reading station, one of such carriers, machine-reading, from its encoded order, and verifying the number of prints of each size to be made, storing such machine-read order information until the photographic package printer is not occupied by any prior carrier, and when the printing of any such prior carrier is completed, then withdrawing such prior carrier from the package printer and delivering it to a completed position, inserting into such package printer the carrier whose order information has been so machine-read and stored, in position for photoprinting, transmitting such stored order information reading to the printer-controller whereby it may direct said package printer to photoprint such plurality of print sizes according to such recalled order, and while the package printer is so occupied by the inserted carrier, as to each succeeding carrier, repeating the aforesaid steps of feeding, machine reading, storing, withdrawing and delivering, inserting and transmitting until the last negative carrier, whose order has been so stored, has been withdrawn and delivered to completed position.

10. The automated method as defined in claim 9, together with the step, following said machine reading step, of rejecting any negative carrier whose encoded order cannot be so machine-read and verified.

11. A manifold form for carriers to mount photographic film, comprising the combination of a web of waxed paper having margins including drivable means, and being divided by score lines into a plurality of equal-sized rectangular portions, and a plurality of die-cut front sheets of paper of generally rectangular shape positioned within said web score lines, each of said front sheets having a coating of pressure sensitive adhesive capable of retaining photographic film which coating is in continuous contact with the waxed paper web, whereby tearing the web along said score lines separates the manifold form into individual negative carriers each comprised of one of said front sheets and a backing sheet of waxed paper, the backing and front sheets of each being so scored as to provide a larger frame opening in the waxed backing sheet and a smaller frame opening in the front sheet aligned in centered position relative to said larger frame opening, both of said sheets being undivided in their areas surrounding their said frame openings.

* * * * *

UNITED STATES PATENT AND TRADEMARK OFFICE

CERTIFICATE OF CORRECTION

PATENT NO. : 4,637,712

DATED : January 20, 1987

INVENTOR(S) : Marc E. Arnold, et al.

It is certified that error appears in the above-identified patent and that said Letters Patent is hereby corrected as shown below:

Column 10, line 14, "reducing" should be ---reading---.

Signed and Sealed this

Twenty-fourth Day of March, 1987

*Attest:*

DONALD J. QUIGG

*Attesting Officer* — *Commissioner of Patents and Trademarks*